United States Patent
Syvertsen

(10) Patent No.: US 10,668,880 B2
(45) Date of Patent: Jun. 2, 2020

(54) COLLISION DETECTING DEVICE FOR A MOTOR VEHICLE FOR DETECTING A COLLISION WITH A PEDESTRIAN

(71) Applicant: Bayerische Motoren Werke Aktiengesellschaft, Munich (DE)

(72) Inventor: Bernt Arne Syvertsen, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 25 days.

(21) Appl. No.: 15/986,949

(22) Filed: May 23, 2018

(65) Prior Publication Data
US 2018/0265024 A1 Sep. 20, 2018

Related U.S. Application Data

(63) Continuation of application No. PCT/EP2016/078054, filed on Nov. 17, 2016.

(30) Foreign Application Priority Data

Nov. 27, 2015 (DE) .................. 10 2015 223 573

(51) Int. Cl.
*B60R 19/48* (2006.01)
*B60R 21/0136* (2006.01)
(Continued)

(52) U.S. Cl.
CPC .......... *B60R 19/483* (2013.01); *B60R 19/023* (2013.01); *B60R 21/0136* (2013.01); *B60R 2021/0053* (2013.01)

(58) Field of Classification Search
CPC .............. B60R 19/483; B60R 21/0136; B60R 2021/0004; B60R 2021/0051; B60R 2021/0053
See application file for complete search history.

(56) References Cited

U.S. PATENT DOCUMENTS

2004/0258855 A1* 12/2004 Migieu ................... B29C 65/02
428/31
2008/0315598 A1* 12/2008 Takafuji ................. B60R 19/483
293/117

(Continued)

FOREIGN PATENT DOCUMENTS

DE  102009034424 A1 * 3/2010 ........... B60R 19/483
DE  10 2009 033 737 A1  1/2011
(Continued)

OTHER PUBLICATIONS

Computer translation of DE 102009034424 (Year: 2009).*
(Continued)

*Primary Examiner* — Gregory A Blankenship
(74) *Attorney, Agent, or Firm* — Crowell & Moring LLP

(57) ABSTRACT

A collision detecting device for a motor vehicle for detecting a collision with a pedestrian has a pressure measuring chamber, which is formed by a tube, and a flexurally stiff structural element. The tube is formed to be deformable in the event of a collision, i.e. as a result of a collision of the motor vehicle with the pedestrian, and is correspondingly arranged. The tube is also supported in a direction, in particular in precisely one direction transverse to a vertical direction of the motor vehicle. In addition, the tube is essentially in particular flexurally stiffly supported on the structural element in precisely one, i.e. in exclusively one, vertical direction of the vehicle.

16 Claims, 2 Drawing Sheets

(51) Int. Cl.
  *B60R 21/00*  (2006.01)
  *B60R 19/02*  (2006.01)

(56) References Cited

U.S. PATENT DOCUMENTS

| | | | |
|---|---|---|---|
| 2009/0015392 A1* | 1/2009 | Takahashi | B60R 19/483 |
| | | | 340/436 |
| 2009/0019940 A1* | 1/2009 | Suzuki | B60R 19/483 |
| | | | 73/800 |
| 2009/0021359 A1* | 1/2009 | Tanabe | B60R 19/483 |
| | | | 340/436 |
| 2009/0024323 A1* | 1/2009 | Tanabe | B60R 21/0136 |
| | | | 701/301 |
| 2011/0012744 A1 | 1/2011 | Buss | |
| 2011/0232396 A1* | 9/2011 | Takahashi | B60R 19/483 |
| | | | 73/862.581 |
| 2012/0029814 A1* | 2/2012 | Mase | B60R 19/18 |
| | | | 701/301 |
| 2013/0127190 A1* | 5/2013 | Shamoto | B60R 19/18 |
| | | | 293/117 |
| 2014/0265445 A1* | 9/2014 | Leach | B60R 19/483 |
| | | | 296/187.04 |
| 2015/0114746 A1 | 4/2015 | Nickel et al. | |
| 2016/0039379 A1* | 2/2016 | Saitoh | B60R 19/18 |
| | | | 293/117 |
| 2016/0101753 A1* | 4/2016 | Higashimachi | B60R 19/023 |
| | | | 293/117 |
| 2017/0043735 A1* | 2/2017 | Yamaguchi | B60R 19/483 |
| 2017/0274850 A1* | 9/2017 | Aizawa | B60R 19/18 |
| 2018/0079381 A1* | 3/2018 | Nakane | B60R 19/483 |
| 2018/0265024 A1* | 9/2018 | Syvertsen | B60R 19/023 |
| 2018/0272971 A1* | 9/2018 | Syvertsen | B60R 19/483 |

FOREIGN PATENT DOCUMENTS

| | | |
|---|---|---|
| DE | 10 2012 005 275 A1 | 11/2012 |
| DE | 10 2012 019 380 A1 | 4/2014 |
| DE | 10 2013 009 312 A1 | 12/2014 |
| DE | 10 2014 009 615 A1 | 12/2014 |
| DE | 10 2013 016 239 A1 | 4/2015 |
| DE | 10 2013 018 323 A1 | 4/2015 |
| JP | 2015-140040 A | 8/2015 |

OTHER PUBLICATIONS

International Search Report (PCT/ISA/210) issued in PCT Application No. PCT/EP2016/078054 dated Feb. 7, 2017 with English translation (six pages).

German-language Written Opinion (PCT/ISA/237) issued in PCT Application No. PCT/EP2016/078054 dated Feb. 7, 2017 (nine pages).

German-language Search Report issued in counterpart German Application No. 10 2015 223 573.4 dated Mar. 24, 2016 with partial English translation (13 pages).

* cited by examiner

COLLISION DETECTING DEVICE FOR A MOTOR VEHICLE FOR DETECTING A COLLISION WITH A PEDESTRIAN

CROSS REFERENCE TO RELATED APPLICATIONS

This application is a continuation of PCT International Application No. PCT/EP2016/078054, filed Nov. 17, 2016, which claims priority under 35 U.S.C. § 119 from German Patent Application No. 10 2015 223 573.4, filed Nov. 27, 2015, the entire disclosures of which are herein expressly incorporated by reference.

BACKGROUND AND SUMMARY OF THE INVENTION

The present invention relates to a collision detection device for a motor vehicle, in particular a passenger motor vehicle, for detecting a collision with a pedestrian, wherein the collision detection device has a pressure measurement chamber which is formed by a tube.

In a motor vehicle, in particular a two-track passenger motor vehicle, it is known to arrange between a bumper cover and a front bumper crossmember an energy-absorption element which, for the purpose of protecting a pedestrian, is deformable at a relatively low force level in the event of a collision of the motor vehicle with the pedestrian. A collision detection sensor system based on pressure measurement is also known. The collision detection sensor system serves for detecting a collision with a pedestrian, with the result that a control unit can actively direct passenger protection measures, for example the raising of a front flap or the triggering of a front windshield airbag, based on this detection. Such a collision detection sensor system has a tube to which there is connected a pressure sensor which is able to detect pressure variations within the tube. The tube is filled with air under atmospheric pressure. If the tube is deformed as a result of the collision with the pedestrian, this brings about a change in pressure in the interior of the tube. Such a tube is normally arranged in the transverse direction of the vehicle in abutment with the bumper crossmember and accommodated in a groove in the energy-absorption element.

Depending on the configuration of the bumper cover, the bumper crossmember and/or the energy-absorption element and also the tube, there is a requirement for improving a response behavior of the collision detection sensor system, that is to say for detecting the collision at an earlier point-in-time and for improving a strength of a detection signal.

It is the object of the present invention to provide a collision detection device for a motor vehicle for detecting a collision with a pedestrian, which device improves a response behavior and/or a sensitivity during the collision with the pedestrian in a low-cost manner by way of a simple measure.

This and other objects are achieved by a collision detection device for a motor vehicle, in particular for a motor vehicle front end or a motor vehicle rear end, for detecting a collision with a pedestrian, having a pressure measurement chamber which is formed by a tube, and having a flexurally rigid structural element, wherein the tube is formed and arranged so as to be deformable in a collision-induced manner and is supported against the structural element in a direction transverse to a vertical direction of the vehicle and in precisely one vertical direction of the vehicle.

The collision detection device according to the invention for a motor vehicle for detecting a collision with a pedestrian has a pressure measurement chamber which is formed by a tube, and has a flexurally rigid structural element. The tube is formed so as to be deformable in a collision-induced manner, that is to say as a result of a collision of the motor vehicle with the pedestrian, and is correspondingly arranged. Also, the tube is supported in one direction, in particular in precisely one direction, transverse to a vertical direction of the vehicle. Furthermore, the tube is substantially, in particular flexurally rigidly, supported against the structural element in precisely one, that is to say in exclusively one, vertical direction of the vehicle. "In precisely one vertical direction of the vehicle" means that the tube is supported either upwardly or downwardly, but is not supported in both of these directions.

The inventors have found that, in the event of a collision with a pedestrian, who normally has a center of gravity which is not located at a height of the tube (the center of gravity is normally located above a vehicle front end), the collision load on the vehicle front end acts obliquely in the direction of the flexurally rigid structural element. It is therefore advantageous if the tube is supported in a direction transverse to the vertical direction of the vehicle, and in precisely one vertical direction of the vehicle, such that both that component of the collision load which acts in the vertical direction of the vehicle and that component of the collision load which acts in the direction transverse to the vertical direction of the vehicle are able to deform the tube effectively. If the tube were supported in both vertical directions of the vehicle, that is to say upwardly and downwardly, that component of the collision load which acts in the vertical direction of the vehicle would be unable to deform the tube. Accordingly, by supporting the tube in precisely one vertical direction, it is possible for a collision load acting on the tube obliquely from below or obliquely from above to be detected better, that is to say more quickly and more sensitively.

The collision detection device is preferably arranged in a motor vehicle front end, but may also be arranged in a motor vehicle rear end.

"A direction transverse to a vertical direction of the vehicle" means in particular a direction perpendicular to or substantially perpendicular to a vertical direction of the vehicle. The direction transverse to the vertical direction of the vehicle is furthermore preferably substantially a longitudinal direction of the vehicle.

According to a preferred refinement of the present invention, the structural element has a first support surface which extends substantially parallel to the vertical direction of the vehicle, and has a second support surface which extends transversely to the vertical direction of the vehicle, for example substantially in a longitudinal direction of the vehicle.

The second support surface may be formed either on a top side or a bottom side of a projection which is connected to the first support surface or the structural element in a flexurally rigid manner or which is formed integrally with the first support surface or the structural element, and a lower side of the tube or an upper side of the tube may be supported against the projection. The term "projection" also covers a shoulder or a step.

The first support surface may in particular be formed behind the tube in the collision direction, and the second support surface may be formed below the tube.

In the case of a motor vehicle front end, this means that the first support surface is formed behind the tube in the main direction of travel of the vehicle.

The structural element may in this case be a crossmember element, in particular a bumper crossmember, and the first support surface may be formed on an outer side of the crossmember element, and the second support surface may be formed on a projection which is connected fixedly in terms of torque to the crossmember element or which is formed integrally with the crossmember element.

In the case of the front bumper crossmember, the first support surface is thus formed on a front side of the bumper crossmember.

According to an alternative advantageous refinement of the collision detection device, the first support surface may be formed in front of the tube in the collision direction, and the second support surface may be formed above the tube.

In particular, the structural element may be a vehicle outer skin, for example a bumper cover, and the first support surface may be formed on an inner side of the vehicle outer skin, and the second support surface may be formed on a projection which is connected fixedly in terms of torque to the vehicle outer skin.

According to a further advantageous refinement of the collision detection device, the second support surface may extend along an entire effective length of the tube.

Alternatively, it is also possible for the second support surface to extend sectionally along the effective length of the tube.

The effective length of the tube is that region of the tube which is provided for detecting the collision with the pedestrian.

This allows a target response behavior to be suitably adapted to the structural conditions of the motor vehicle.

According to a further preferred refinement of the present invention, in the collision detection device, the tube is surrounded at least partially by a plastically deformable energy-absorption element or is at least adjacent to the energy-absorption element, wherein the energy-absorption element is arranged in front of or behind the structural element in the collision direction.

This allows the oblique collision load to better deform the tube as a result of mutual supporting of the tube between the energy-absorption element and the structural element, with use made of the components of the collision load in a vertical direction and the direction transverse to the vertical direction. In other words, in the event of a collision, the tube is clamped obliquely between the energy-absorption element and the structural element by way of the obliquely acting collision load.

The energy-absorption element is for example a so-called pedestrian protection element, in particular a passive pedestrian protection element.

The energy-absorption element consists for example of a foam, in particular a thermoplastic foam, which, for the purpose of protecting pedestrians, is deformable at a relatively low force level.

The energy-absorption element is arranged for example between a vehicle outer skin and a crossmember.

The energy-absorption element may bear against the tube, or at least come into abutment with the tube in the event of a collision, on sides of the tube which are not supported, which are in particular not supported in a longitudinal direction of the vehicle and in a vertical direction of the vehicle. In other words, the tube is indirectly or directly supported against the energy-absorption element in the other, that is to say opposite, vertical direction of the vehicle, and the tube is indirectly or directly supported against the energy-absorption element in the opposite direction to the direction transverse to the vertical direction of the vehicle.

The tube preferably consists of an extruded plastic material, for example an elastomer material, in particular a silicone material. This material is inexpensive and permits an easily deformable tube.

The collision detection device also advantageously has a pressure sensor which is arranged such that it communicates with the pressure measurement chamber. The pressure sensor is adapted to detect a pressure and/or a change in pressure in the pressure measurement chamber as a result of the collision-induced deformation of the tube.

Here, "collision direction" identifies the direction in which the collision counterpart, that is to say the pedestrian, collides with the motor vehicle, that is to say the direction in which the collision counterpart exerts a collision force on the motor vehicle.

Above-mentioned refinements of the invention may be combined with one another in any desired manner where possible and expedient.

Other objects, advantages and novel features of the present invention will become apparent from the following detailed description of one or more preferred embodiments when considered in conjunction with the accompanying drawings.

A detailed description of the exemplary embodiments of the present invention follows with reference to the figures.

DETAILED DESCRIPTION OF THE DRAWINGS

Figure 1:
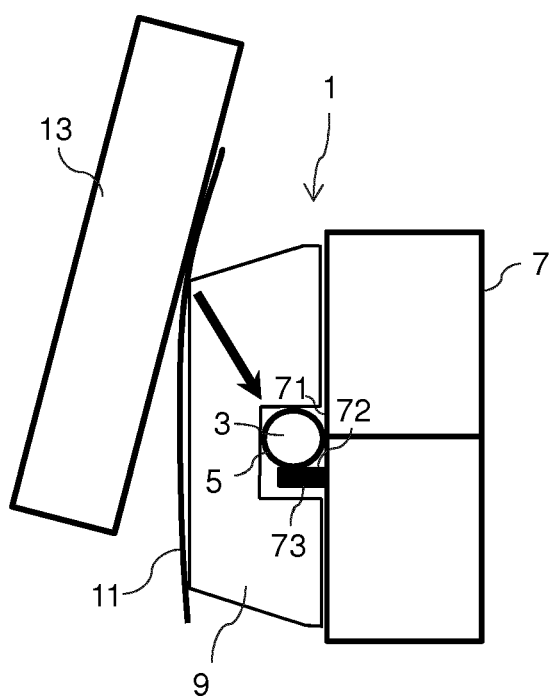
FIG. 1 is a schematic sectional view of a collision detection device as per a first exemplary embodiment of the present invention.

FIG. 1 shows a schematic sectional view of a collision detection device 1 as per a first exemplary embodiment of the present invention. The collision detection device 1 is intended for a motor vehicle front end of a motor vehicle, in particular a passenger motor vehicle, for detecting a collision with a pedestrian. The collision detection device 1 has a pressure measurement chamber 3 which is formed by an elastically deformable tube 5 composed, for example, of a silicone material. The tube 5 is supported against a bumper crossmember 7, that is to say against a front side 71 of the bumper crossmember 7. The front side 71 of the bumper crossmember 7 is a first support surface according to the present invention.

Furthermore, in the vertical direction of the vehicle, the tube 5 is supported downwardly against a projection 73 with a support surface 72 which supports the tube 5 from below and which forms a second support surface according to the present invention.

The motor vehicle front end also has a bumper cover 11, wherein arranged between the bumper cover 11 and the bumper crossmember 7 is an energy-absorption element 9, that is to say a pedestrian protection element, which consists of a plastically deformable foam. The energy-absorption element 9 surrounds the tube 5 in particular from the front and from above. The tube 5 is supported against the bumper crossmember 7 with the projection 73, which is fastened to said crossmember in a flexurally rigid manner, only rearwardly (from behind) and downwardly (from below). Accordingly, the tube is arranged between the bumper crossmember 7, the projection 73 and the energy-absorption element 9.

Connected to the pressure measurement chamber 3 of the tube 5 is at least one pressure sensor which is able to detect a change in pressure in the pressure measurement chamber 3, the latter being filled with air under atmospheric pressure. A change in pressure in the pressure measurement chamber 3 is caused by a deformation of the tube, said deformation bringing about a change in volume of the pressure measurement chamber 3.

Below, an effect and function of the collision detection device 1 as per the first exemplary embodiment are described.

In the event of a front-end collision of the motor vehicle (or the motor vehicle front end) with a pedestrian 13, a collision force acts on the energy-absorption element 9 obliquely from the front and above obliquely downwardly and rearwardly owing to the height and the center of gravity of the pedestrian 13, said center of gravity being located well above the tube 5. The energy-absorption element 9 transmits this force to the tube 5. A direction of action of the collision force is illustrated in FIG. 1 by an arrow. Since the tube 5 is supported both rearwardly in the longitudinal direction of the vehicle and downwardly in the vertical direction of the vehicle, a deformation of the tube 5 obliquely downwardly and rearwardly by way of the collision force, which is transmitted by the energy-absorption element 9 obliquely from the front and above, is promoted. Thus, a quicker and/or a clearer or better collision detection signal—that is to say a change in pressure—is generated. Furthermore, the tube 5 can be deformed easily since it is not supported from above by the structural element 7.

The collision-induced deformation of the tube 5 brings about the change in pressure in the pressure measurement chamber 3, which change in pressure is in turn able to be detected by a pressure sensor. The quicker and more intensely the tube 5 is deformed during the collision with the pedestrian, the earlier and better a collision detection signal can be obtained by the collision detection device and the earlier suitable active pedestrian protection measures, such as for example the raising of a front flap or the triggering of a front windshield airbag or pedestrian protection airbag, can accordingly be directed and deployed.

A second exemplary embodiment of the present invention is described below with reference to FIG. 2, wherein, in particular, the differences with the first exemplary embodiment are addressed and any features in common with the first exemplary embodiment are not described again.

Figure 2:
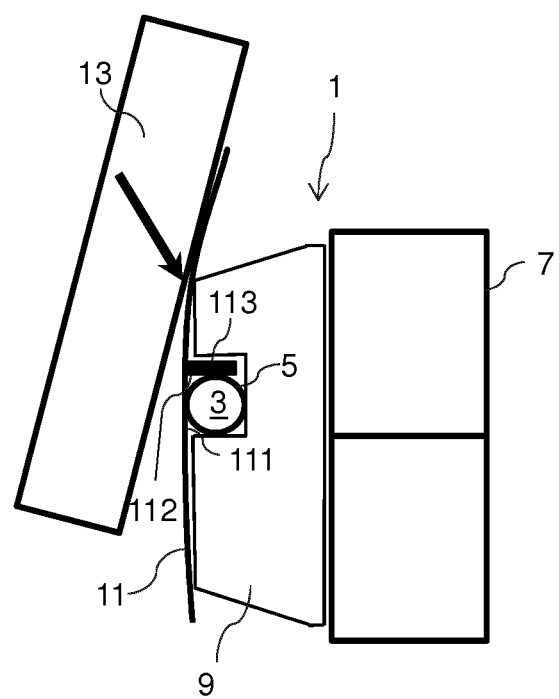
FIG. 2 is a schematic sectional view of a collision detection device as per a second exemplary embodiment of the present invention.

As is shown in FIG. 2, a motor vehicle front end has a bumper crossmember 7, on the front side of which an energy-absorption element 9 is arranged. The motor vehicle front end also has a bumper cover 11.

In contrast with the first exemplary embodiment, in the second exemplary embodiment, an inner side 111 of the bumper cover 11 forms a first support surface according to the present invention, and a projection 113, which is connected fixedly in terms of torque to the bumper cover 11, in particular at a lower side 112 of the projection 113, forms a second support surface according to the present invention. In other words, a tube 5, together with its pressure measurement chamber 3, is supported forwardly (from in front) and upwardly (from above) by the inner side 111 of the bumper cover 11 and the projection 113 connected thereto, that is to say the lower side 112 of the projection 113. The tube 5 is furthermore surrounded by the energy-absorption element 9.

A description of the function and manner of operation of the collision detection device 1 as per the second exemplary embodiment of the present invention follows with reference to FIG. 2.

Analogously to the first exemplary embodiment, in the event of a front-end collision of the motor vehicle with a pedestrian 13, a collision force acts on the motor vehicle front end, that is to say the bumper cover 11 and the energy-absorption element 9 which is arranged therebehind and which is supported against the bumper crossmember 7, from the front and above rearwardly and downwardly. Consequently, the tube 5 is pushed against the adjacent energy-absorption element 9 from the front and above rearwardly and downwardly by the lower side 112 of the projection 113 and by the inner side 111 of the bumper cover 11, and deformed as a result. Analogously to the first exemplary embodiment, in the second exemplary embodiment, improved force transmission of the collision force, acting obliquely from the front and above, to the tube 5 is realized according to the invention by way of the two support surfaces formed in different directions, as a result of which the deformation of said tube is promoted and a collision detection signal is accordingly generated in a quicker and better manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A collision detection device for a motor vehicle that detects a collision with a pedestrian, comprising:
    a pressure measurement chamber which is formed by a cylindrical tube; and
    a flexurally rigid structural element, wherein
    the cylindrical tube is formed and arranged so as to be deformable in a collision-induced manner and is supported against the structural element in precisely one direction transverse to a vertical direction of the vehicle and in precisely one vertical direction of the vehicle;
    a plastically deformable energy-absorption element that at least partially surrounds the tube in the direction transverse to the vertical direction and in the vertical direction, wherein
    the energy-absorption element is arranged in front of or behind the structural element in the collision direction.

2. The collision detection device as claimed in claim 1, wherein
    the structural element has a first support surface which extends substantially parallel to the vertical direction of the vehicle and has a second support surface which extends transversely to the vertical direction of the vehicle.

3. The collision detection device as claimed in claim 2, wherein
    the second support surface is formed either on a top side or a bottom side of a projection which is connected to the first support surface in a flexurally rigid manner or which is formed integrally with the first support surface or the structural element, and
    a lower side of the tube or an upper side of the tube is supported against the projection.

4. The collision detection device as claimed in claim 3, wherein the first support surface is formed behind the tube in a collision direction, and the second support surface is formed below the tube.

5. The collision detection device as claimed in claim 2, wherein the first support surface is formed behind the tube in a collision direction, and the second support surface is formed below the tube.

6. The collision detection device as claimed in claim 4, wherein the structural element is a crossmember element, the first support surface is formed on an outer side of the crossmember element, and the second support surface is formed on a projection which is connected fixedly in terms of torque to the crossmember element or which is integrally formed with the first support surface or the crossmember element.

7. The collision detection device as claimed in claim 6, wherein the crossmember element is a bumper crossmember.

8. The collision detection device as claimed in claim 2, wherein the first support surface is formed in front of the tube in a collision direction, and the second support surface is formed above the tube.

9. The collision detection device as claimed in claim 3, wherein the first support surface is formed in front of the tube in a collision direction, and the second support surface is formed above the tube.

10. The collision detection device as claimed in claim 8, wherein the structural element is a vehicle outer skin, the first support surface is formed on an inner side of the vehicle outer skin, and the second support surface is formed on a projection which is connected fixedly in terms of torque to the vehicle outer skin or which is integrally formed with the first support surface or the vehicle outer skin.

11. The collision detection device as claimed in claim 10, wherein the vehicle outer skin is a bumper cover.

12. The collision detection device as claimed in claim 2, wherein the second support surface extends along an entire effective length of the tube, or the second support surface extends sectionally along the effective length of the tube.

13. The collision detection device as claimed in claim 1, wherein the energy-absorption element is a pedestrian protection device.

14. The collision detection device as claimed in claim 1, wherein the energy-absorption element bears against the tube, or comes into abutment with said tube in the event of a collision, on sides of the tube which are not supported.

15. The collision detection device as claimed in claim 14, wherein the sides of the tube are not supported in a longitudinal direction of the vehicle and in a vertical direction of the vehicle.

16. The collision detection device as claimed in claim 1, wherein the collision detection device is configured for a front end or a rear end of the motor vehicle.

* * * * *